Dec. 15, 1959 M. D. DIXON 2,917,256
FLORAL SPRAY HOLDER
Filed May 24, 1954

INVENTOR.
Max D. Dixon
BY
ATTORNEY.

United States Patent Office 2,917,256
Patented Dec. 15, 1959

2,917,256
FLORAL SPRAY HOLDER
Max D. Dixon, Miami, Okla.
Application May 24, 1954, Serial No. 431,704
1 Claim. (Cl. 248—27.8)

This invention relates to decorative floral arrangements, and particularly to that type of arrangement in which the individual flowers of a spray are received and supported by a flower-receiving member such as a vase or a porous block into which the stems of the individual flowers may be inserted.

It is the most important object of the present invention to provide supporting structure for the member which permits display of the arrangement on arcuate, sloped, or otherwise irregularly-shaped surfaces.

A further important object of this invention is the provision of supporting structure which is adapted for attachment to flower-receiving members of various sizes and shapes according to the dimensions of the particular floral arrangement.

With these and other objects in view, the floral spray holder of the present invention generally comprises a flower-receiving member in which the individal flowers are arranged; and one or more arched or arcuate resilient elements on which the members are mounted for displaying a floral arrangement, the element being readily adjustable to conform to whatever irregularly-shaped surface is chosen for display.

Additional objects of this invention will become apparent from the specification which follows, and from a study of the accompanying drawings, wherein.

Heretofore it has been the practice, in arranging floral displays, to use meshed wire or the like as a base for the display, and to attach the individual flowers by winding the reinforced stems thereof about the wires of the base. When such an arrangement is to be displayed on irregularly-shaped or arcuate surfaces, such as a casket top, or at an angle, so as to be easily visible, it is necessary to use a platform which conforms to the display surface and which presents the floral arrangement at the desired angle.

Recent strides in the plastics field have made many porous, lightweight plastics commercially available, and it is now quite common to use blocks of plastic foam, such as expanded polysterene, as the base for floral displays. The use of such material does away with the time-consuming task of attaching the stems to meshed wire since the reinforced stems are easily inserted in the plastic and remain embedded therein due to the very nature of the material.

The big disadvantage in the use of plastic foam has been that the lightweight, rigid block does not provide a stable platform for the display when used on arcuate, sloped and irregularly-shaped surfaces. For the same reasons, the angular platforms used with the meshed wire supports have not proved to be satisfactory when used with the plastic blocks.

Figure 1:
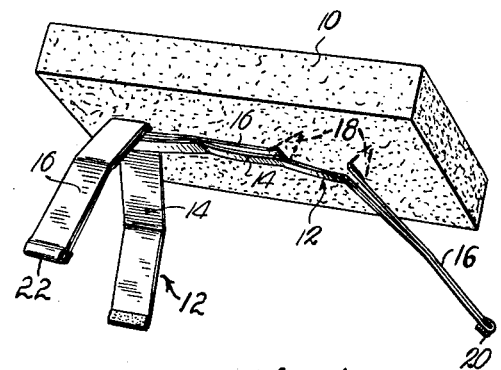
Figure 1 is a perspective view of the floral spray holder of the present invention, showing one form of supporting structure therefor.

To meet the problem of properly positioning a flower-receiving member in the nature of a plastic block 10 of the aforementioned character on arcuate or sloped surfaces, I provide, in the embodiment of my invention shown in Fig. 1 support elements 12, adapted for attachment to the block 10. Each of the elements 12 is preferably made from an initially flat, elongated strap of resilient material, rebent upon itself to present an upwardly arched portion or bight 14, intermediate the ends thereof, and a pair of opposed legs 16 extending upwardly from the portion 14. The legs 16 are yieldable toward and away from bight 14 due to the inherent resiliency of the material from which the elements 12 are made. Each of the legs 16 is provided with an upstanding, pointed projection 18, which is adapted to piece the block 10.

Friction means or pads 20 are attached to each end of the bight portion 14, adjacent lines of bend 22 between the bight 14 and the legs 16.

When it is desired to apply the support elements 12 to the block 10, it is only necessary to hold the legs 16 against bight 14 while piercing the block 10 with the pointed projections 18. When the legs 16 are released, they will tend to spread, due to the resiliency of the elements 12, and this inherent tendency of the legs 16 will cause the support elements 12 to remain firmly embedded in the block member 10. It can thus be seen that, by using two or more of the elements 12, and mounting the same in spaced relationship on the bottom face of the block 10, a stable supporting means is provided for displaying a floral spray (not shown) on an irregularly-shaped surface such as a casket top. Prior to use, the configuration of the bight 14 of the straps 12 can be altered so as to conform substantially to virtually any particular surface regardless of its contour. The friction pads 20 engage the surface of the casket to prevent any slipping relative thereto.

The support elements 12 thus far described have a variety of uses in the fabrication of unique and distinctive floral arrangements.

The elements 12 may be inserted in the block 10 in spaced-apart relation to provide four points of contact with the supporting surface such as a casket top or, as shown in Fig. 1, by displacing one of the elements 12 by 90° and by bending one of its legs 16 and a corresponding segment of bight portion 14 into engagement with block member 10. In this manner a floral spray holder is presented in which the supporting structure comprises three of the legs 16 of the two elements 12.

Figure 2:
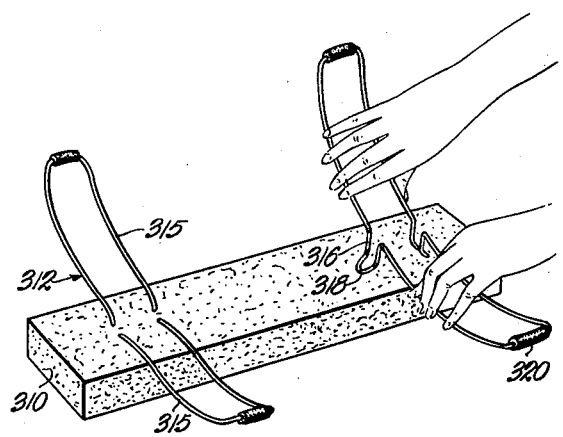
Fig. 2 is a perspective view of another form of floral spray holder showing a modification of the resilient supporting elements of Fig. 1, and the manner of mounting the same.
Figure 4:
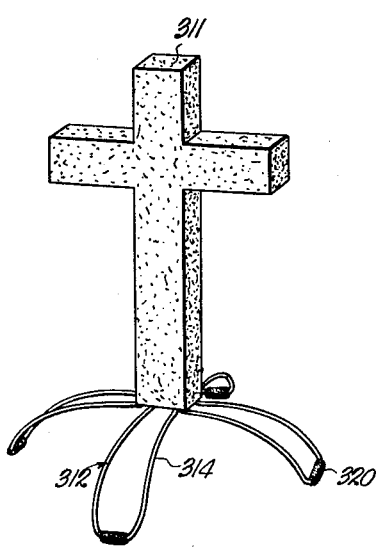
Fig. 4 is a perspective view of a floral spray holder made in accordance with the teachings of the present invention and illustrating one of many ways in which the resilient supporting elements of Figs. 2 and 3 may be used.
Figure 3:
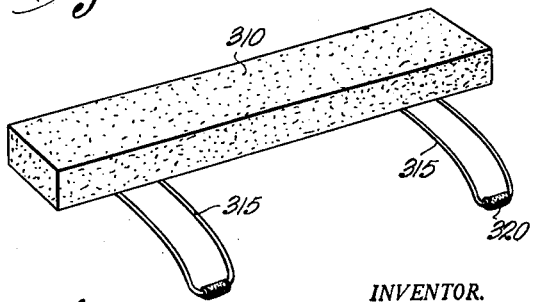
Fig. 3 is a top, perspective view of the floral spray holder of Fig. 2.

In the modified form of the supporting structure of the present invention illustrated in Figs. 2–4 each of the supports 312 comprises a rectangular element or frame 314 having extensions 316 and projections 318 formed therein. At each end of element or frame 314, there is provided friction means or pads 320 which grip the surface chosen for display. As shown in Fig. 2, arcuate legs 315 may be squeezed together, due to the resiliency of the material from which frame 314 is made, and projections 318 inserted into porous block member 310, after which the legs 315 are released. The frame 314 then expands to its normal condition so that the supports 312 are firmly mounted on block member 310.

As is the case with the supporting elements 12 of Fig. 1, supports 312 may be bent in various ways to vary the angle at which a floral arrangement is displayed. For example, the arcuate portions 315 may be criss-crossed, as the supports 312 are mounted on a block member 311, to present an upstanding floral spray holder such as that shown in Fig. 4.

It is obvious that many modifications other than those illustrated in the accompanying drawing may be made without departing from the spirit of the present invention, and it is desired therefore, to be limited only by the scope of the appended claim.

Having thus described the invention, what is claimed as new and desired to be secured by Letters Patent is:

In a floral spray holder having a plastic foam block, a support for attachment to the lower face of the block therebeneath comprising a rectangular, arcuate frame, said frame comprising a pair of spaced, longitudinal legs interconnected at their ends, said frame being formed from a single length of resilient material whereby said legs may be moved toward and away from each other; upward extensions at the center of each leg respectively; and a substantially U-shaped projection on the extensions of each leg respectively adapted to pierce the block while the legs are pressed together, said projections being inclined outwardly with respect to said extensions said projections extending laterally from the legs whereby the extensions and their respective projection embed in the block when the legs are released and allowed to move apart.

References Cited in the file of this patent

UNITED STATES PATENTS

| | | |
|---|---|---|
| 1,015,183 | Hering | Jan. 16, 1912 |
| 1,480,746 | De Bie | Jan. 15, 1924 |
| 2,225,681 | Braun | Dec. 24, 1940 |
| 2,234,512 | Wilson | Mar. 11, 1941 |
| 2,259,209 | Lucas | Oct. 14, 1941 |
| 2,261,326 | Atkisson | Nov. 4, 1941 |
| 2,560,643 | Hallock | July 17, 1951 |
| 2,737,746 | Orr | Mar. 13, 1956 |

FOREIGN PATENTS

| | | |
|---|---|---|
| 675,077 | Great Britain | July 2, 1952 |